US012229314B2

(12) United States Patent
Ralph et al.

(10) Patent No.: US 12,229,314 B2
(45) Date of Patent: Feb. 18, 2025

(54) ENHANCED DATA PRIVACY THROUGH STRUCTURE-PRESERVING AUTOENCODER WITH LATENT SPACE AUGMENTATION

(71) Applicant: FAIR ISAAC CORPORATION, Roseville, MN (US)

(72) Inventors: Christopher Allan Ralph, Toronto (CA); Gerald Fahner, Austin, TX (US)

(73) Assignee: FAIR ISAAC CORPORATION, Minneapolis, MN (US)

( * ) Notice: Subject to any disclaimer, the term of this patent is extended or adjusted under 35 U.S.C. 154(b) by 304 days.

(21) Appl. No.: 17/739,107

(22) Filed: May 7, 2022

(65) Prior Publication Data

US 2023/0359767 A1    Nov. 9, 2023

(51) Int. Cl.
G06F 21/62    (2013.01)

(52) U.S. Cl.
CPC .................. *G06F 21/6254* (2013.01)

(58) Field of Classification Search
CPC .................................................. G06F 21/6254
See application file for complete search history.

(56) References Cited

U.S. PATENT DOCUMENTS

| 2020/0082041 | A1* | 3/2020 | Albert | G06F 30/27 |
| 2021/0132189 | A1* | 5/2021 | Binzer | G01S 7/412 |
| 2021/0335029 | A1* | 10/2021 | Kowalski | G06T 15/005 |
| 2023/0305824 | A1* | 9/2023 | Allamanis | G06F 8/51 |

OTHER PUBLICATIONS

Krishna Khadka • Jaganmohan Chandrasekaran • Yu Lei • Raghu N. Kacker • D. Richard Kuhn; Synthetic Data Generation Using Combinatorial Testing and Variational Autoencoder; 2023 IEEE International Conference on Software Testing, Verification and Validation Workshops (ICSTW) (2023, pp. 228-236); (Year: 2023).*
Xudong Hu • Guihai Zhang • Biplab Sikdar; Synthetic Time-Series Data Generation with 3D Convolution for EV Systems; 2024 IEEE 99th Vehicular Technology Conference (VTC2024-Spring) (2024, pp. 1-6); (Year: 2024).*
Zhiqiang Wan . Yazhou Zhang . Haibo He; Variational autoencoder based synthetic data generation for imbalanced learning; 2017 IEEE Symposium Series on Computational Intelligence (SSCI) (2017, pp. 1-7); (Year: 2017).*

* cited by examiner

*Primary Examiner* — Luu T Pham
*Assistant Examiner* — Chao Wang
(74) *Attorney, Agent, or Firm* — Mintz, Levin, Cohn, Ferris, Glovsky and Popeo, P.C.; F. Jason Far-hadian, Esq.

(57) ABSTRACT

A method, a system, and a computer program product for generating a refined synthetic data from one or more sources of data. One or more source data are received from one or more data sources. One or more encoded source data are generated from the one or more source data. A synthetic data is generated by decoding one or more encoded source data. One or more variables in the synthetic data are selected and one or more predetermined identifiability values and one or more predetermined anonymity values are associated with them. The generated synthetic data including the selected variables is decoded using associated one or more predetermined identifiability values and one or more predetermined anonymity values. The decoded synthetic data is outputted.

18 Claims, 5 Drawing Sheets

ENHANCED DATA PRIVACY THROUGH STRUCTURE-PRESERVING AUTOENCODER WITH LATENT SPACE AUGMENTATION

BACKGROUND

Information about various entities, companies, individuals, etc. including, but not limited to personal information, medical information, financial information, such as, transactions, amount of assets, outstanding debts, purchases, credit scores, can be sensitive. For example, information about an entity's purchases can reveal a great deal about that entity's history, such as places visited, entity's contacts, products bought/used, entity's activities/habits, etc. Unauthorized access to such information may result in substantial harm and/or loss to that entity through commission of fraud, identity theft, etc. While various data protection mechanisms exist, they do not provide enhanced protection of sensitive data and/or are not capable of preserving structural aspects of the original data.

SUMMARY

In some implementations, the current subject matter relates to a computer implemented method for generating a refined (de-identified and anonymized) synthetic data from one or more sources of data. The method may include receiving, using at least one processor, one or more source data from one or more data sources, generating one or more encoded source data from one or more source data, generating a synthetic data by decoding one or more encoded source data, selecting one or more variables in the synthetic data and associating one or more predetermined identifiability values and one or more predetermined anonymity values, decoding the generated synthetic data including the selected variables using associated one or more predetermined identifiability values and one or more predetermined anonymity values, and outputting the decoded synthetic data.

In some implementations, the current subject matter can include one or more of the following optional features. The generating of one or more encoded source data and the generating of synthetic data may be performed using a neural network based generative model (e.g., autoencoder).

In some implementations, the predetermined identifiability values may be determined based on one or more augmented vectors defined based on one or more variables in the generated synthetic data and a distance between one or more augmented vectors and one or more variables in the one or more source data. The decoded synthetic data may be generated using one or more augmented vectors. One or more predetermined anonymity values may be determined based on a comparison of one or more variables in one or more source data and one or more variables in the decoded synthetic data.

In some implementations, the method may include determining one or more matches between one or more values associated with one or more variables in one or more source data and one or more variables in the decoded synthetic data, and generating, based on one or more determined matches, one or more predetermined anonymity values.

In some implementations, the receiving may include pre-processing received one or more source data to remove one or more errors (e.g., missing values, missing methods, etc.) from one or more source data.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
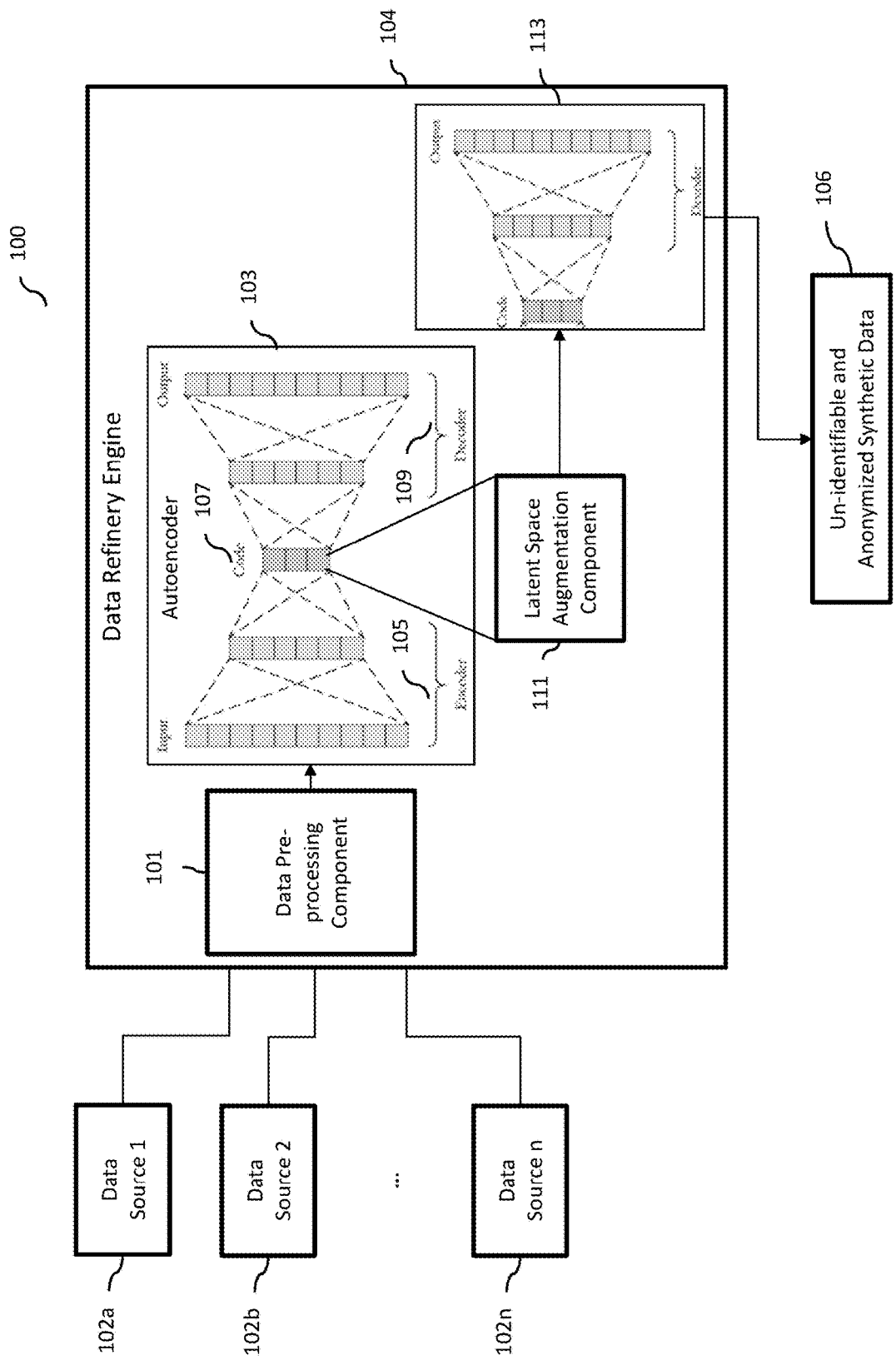
FIG. 1 illustrates an exemplary system for executing refining of input source data to generate un-identifiable and anonymized synthetic data, according to some implementations of the current subject matter.

In some implementations, the current subject matter may be configured to provide an efficient solution for enhancing data privacy through structure-preserving autoencoders with latent space augmentation.

Synthetic data refers to any production data applicable to a particular situation that is not obtained by direct measurement. It may also be information that is persistently stored and used to conduct various business processes. Synthetic data may also refer to an ability to keep data confidential, whereby instead of actual data distribution, synthetic data is generated and released. Typically, data that may be generated using a computer simulation may be referred to as synthetic data. Synthetic data may be generated by population models, also known as generative models. It may retain relevant statistical properties of the original data, where individual synthetic records are unidentifiable and/or anonymous (e.g., no synthetic record may be traced to a specific original record and/or a specific real person). In privacy protection, generation of synthetic data may refer to an involved process of data anonymization, where synthetic data is a subset of anonymized data. Synthetic data may be used to filter information that may otherwise compromise confidentiality of data through either direct identifiers (e.g., human information, such as, name, home address, IP address, telephone number, social security number, credit card number), and/or through reverse engineering of a subset of identifiable data elements that can be linked to other sources to isolate particular individuals. However, the current processes for generation of synthetic data typically do not preserve fidelity of data while retaining highest level of security that may be afforded by the generation of synthetic data and the data itself.

In some implementations, the current subject matter provides a data refinery process that may be configured to transform sensitive source data into secure synthetic data by optimizing one or more trade-offs between synthetic data fidelity and security of the data. Synthetic data fidelity may be defined as a high retention of information content, measured by predictive power relative to real data. Synthetic data security may be defined as a high dissimilarity with original data, measured by a combination of low identifiability and high anonymity.

In some implementations, to de-identify a source data dataset (e.g., arranged in columns and rows), while balancing synthetic data fidelity and security, the current subject matter may be configured to make it very difficult and/or substantially impossible to trace a row of data from a 'refined' version of the data (e.g., synthetic data) back to any individual row in the original source data while retaining the detailed multivariate structure of the original data, such that analysis of the refined version of data may be used to generate results that are very close to the same analysis on the original source. To do so, the current subject matter may be configured to implement a neural network-based generative model, e.g., an autoencoder. The autoencoder may be an unsupervised learning model and may include an input layer (e.g., an encoder part), an output layer (e.g., a decoder part), and a hidden layer that connects the input and output layers.

The encoder part of the autoencoder may be configured to reduce dimensionality of the original input data (e.g., which may be scaled and/or pre-processed) to generate a latent space. The latent space may then be used as an input to the decoder part of the autoencoder. The decoder part may be configured to generate synthetic data that may be configured to closely match to the original source data. The current subject matter may be configured to execute a refinement process in the latent space of the autoencoder to refine the reduced-dimension data, which may then be re-run through the decoder part of the autoencoder to generate synthetic data that is un-identifiable.

To execute the refinement of the input data in the latent space and to balance synthetic data fidelity and synthetic data security requirements, the current subject matter may be configured to determine and/or select one or more variables that may be classified as sensitive and need to be refined, determine and/or select identifiability threshold (e.g., 0-100%, where 0% corresponds to synthetic data being least identifiable with the source data; and 100% corresponds to synthetic data being most identifiable with the source data), determine and/or select anonymity threshold (e.g., k), and, optionally, determine and/or select a target variable to evaluate predictive power of synthetic data versus source data. Using the determined/selected parameters, the decoder part of the autoencoder may be configured to generate synthetic data that may have desired high-fidelity and/or desired high-security.

The current subject matter data refinery process may be advantageous in that it may be configured to overcome data security issues that prevent sharing of real data by generating synthetic data that effectively replicates a multivariate data structure used to store a synthetic approximation of the source data, e.g., a table with columns and rows, without including any original data rows.

FIG. 1 illustrates an exemplary system 100 for executing refining of input source data to generate un-identifiable and anonymized synthetic data, according to some implementations of the current subject matter. The system 100 may include one or more data sources 102 (a, b . . . n) and a data refinery engine 104 that may be configured to generate one or more refined (e.g., un-identifiable and anonymized) synthetic data 106. The system 100 may be configured to be implemented in one or more servers, one or more databases, a cloud storage location, a memory, a file system, a file sharing platform, a streaming system platform and/or device, and/or in any other platform, device, system, etc., and/or any combination thereof. One or more components of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components of the system 100 may include any combination of hardware and/or software. In some implementations, such components may be disposed on one or more computing devices, such as, server(s), database(s), personal computer(s), laptop(s), cellular telephone(s), smartphone(s), tablet computer(s), and/or any other computing devices and/or any combination thereof. In some implementations, these components may be disposed on a single computing device and/or can be part of a single communications network. Alternatively, or in addition to, the components may be separately located from one another.

The engine 104 may be configured to execute one or more functions associated with synthesizing and refining data received from one or more data sources 102. The synthesizing/refining of data from data source may be performed in response to a query that may be externally received from one or more users of the system 100 (not shown in FIG. 1). Such users may include any users, user devices, entities, software applications, functionalities, computers, and/or any other type of users, device, etc.

The source(s) of data 102 may be configured to store and/or provide various data, such as for example, transactional data, time-series data, tradeline data, snapshot data, and/or any other data, and/or any combinations thereof. The data may be arranged in one or more tables, one or more rows, one or more columns, and/or in any other desired way.

The data refinery engine 104 may be configured to include an autoencoder component 103. The autoencoder component 103 may be configured as a neural network and may include an encoder component 105, a latent space vector component 107, and a decoder component 109. The data refinery engine 104 may also include a latent space augmentation component 111 that may be configured to augment processing in the coding component 107 and a decoder component 113 that may be configured to receive output of the latent space augmentation component 111 for generation of the output data 106. In some exemplary implementations, the decoder component 113 may be the same as the decoder component 109, whereby augmented data resulting from the latent space augmentation component 111 is re-run through the decoder component 109.

In some exemplary implementations, the data received from the data sources 102 may, optionally, be pre-processed by the data pre-processing component 101 of the data refinery engine 104. The pre-processing performed by the component 101 may be configured to prepare the data from the data sources for processing through the autoencoder component 103. For example, pre-processing may be performed using one or more classes, e.g., "LowerCase" (correcting lower case problems in the source data), "UpperCase" (correcting upper case problems in the source data), "NumericMissingValue" (correcting missing numerical values in the source data), "NumericMissingMethod" (encoding missing numerical values as one-hot encoded sub-features in the source data), "CharMissingValue" (correcting missing string values in the source data), "CharMissingMethod" (encoding missing string values as one-hot encoded sub-features in the source data), "DropVariables" (correcting dropped variables in the source data), "BoxOutlierTreatment" (addressing outlier data values in the source data), "CharEncoder" (addressing categorical encoding issues in the source data), "LowVarianceMethod" (addressing low variance and/or rescaling problems in the source data), and/or any others. Once the problems are addressed, the pre-processed data will be in a form suitable for training neural networks and may be supplied as input to the autoencoder component 103.

As stated above, the autoencoder component 103 may include the encoder component 105 that may receive the pre-processed data from the component 101 and may reduce dimensionality of the source data to generate a latent space as output. The output of the encoder component 105 may be processed by the coding portion 107 of the autoencoder component 103. The output of the coding portions 107 may serve as an input to the decoder component 109 of the autoencoder component 103. The output of the decoder component 109 may include synthetic data that may correspond to the original source data received from one or more sources of data 102.

In some implementations, the coding portion 107 may be configured to execute an augmentation of the latent space using the latent space augmentation component 111. Augmentation of the latent space may be executed during a first processing of the source data and/or one or more of the subsequent processing of the synthetic data that may be generated by the autoencoder's decoder component 109. Either the decoder component 109 and/or the decoder component 113 may be configured to process data that has been augmented by the component 111.

Figure 2:
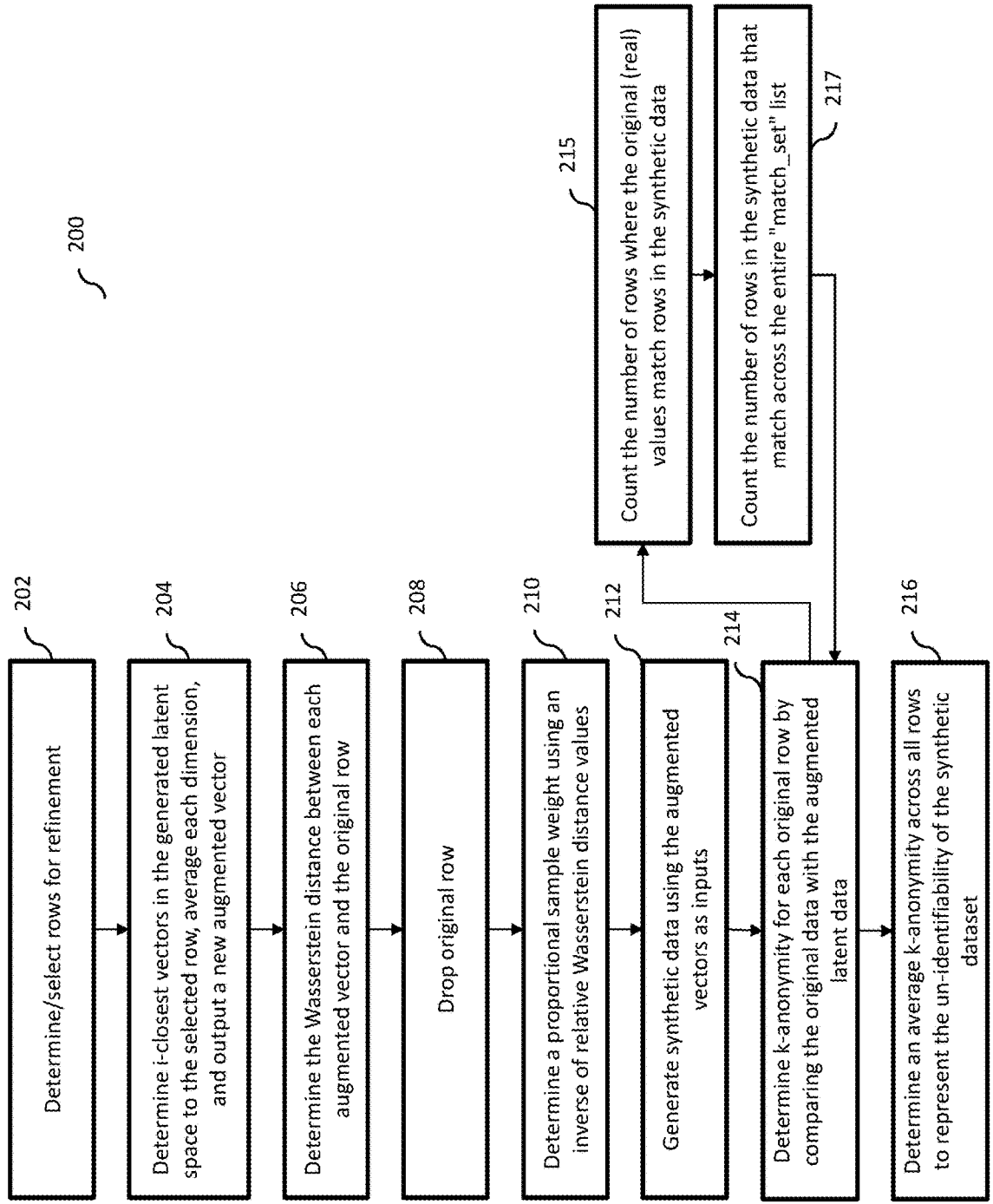
FIG. 2 illustrates an exemplary data augmentation process that may be executed by the latent space augmentation component shown in FIG. 1, according to some implementations of the current subject matter.

FIG. 2 illustrates an exemplary data augmentation process 200 that may be executed by the latent space augmentation component 111 shown in FIG. 1, according to some implementations of the current subject matter. At 202, the component 111 may determine and/or select one or more variables (e.g., rows) that may be classified as sensitive and need to be refined. For example, the component 111 may select a number of variables, n (e.g., n=5) for refinement. Here, the component 111 may determine and/or select identifiability threshold (e.g., 0-100%, where 0% corresponds to synthetic data being least identifiable with the source data; and 100% corresponds to synthetic data being most identifiable with the source data). For each selected row, starting with the second, i.e., i=1 ... K, the component 111 may determine the i-closest vectors in the generated latent space to the selected row, average each dimension, and output a new augmented vector, at 204. At 206, the component 111 may be configured to determine the Wasserstein distance (a distance function defined between probability distributions on a given metric space) between each augmented vector and the original row. It should be noted that the lower the value of the Wasserstein distance, the closer the augmented vector is to the original row. The original row may be dropped from further processing by the component 111, at 208.

At 210, for each augmented vector, the component 111 may determine a proportional sample weight using an inverse of relative Wasserstein distance values (e.g., augmented vectors closer to the original may have higher weights). If the value of K is five, for example, the original row may now be represented by five augmented vectors with appropriate sample weights, and the latent space vector that was output from the encoder component that represents the original row may be dropped. At 212, the component 111 may be configured to generate synthetic data using the augmented vectors as inputs, retaining the row-level sample weights on each row.

Now, the component may determine and/or select anonymity threshold (e.g., k), and, optionally, determine and/or select a target variable to evaluate predictive power of synthetic data versus source data. In particular, at 214, the component 111 may be configured to determine k-anonymity for each original row by comparing the original data with the augmented latent (i.e., refined) data.

In particular, for each original data row, the component 111 may be configured to execute the following. For each column, at 215, the component 111 may count the number of rows where the original (real) values match rows in the synthetic data. Any column with at least one matching row may be transferred into a "match_set" list (list of matching entries). At 217, the component 111 may count the number of rows in the synthetic data that match across the entire "match_set" list. This may correspond to k-anonymity for a particular row, i.e., the number of rows that may be matched to the original row.

Figure 3:
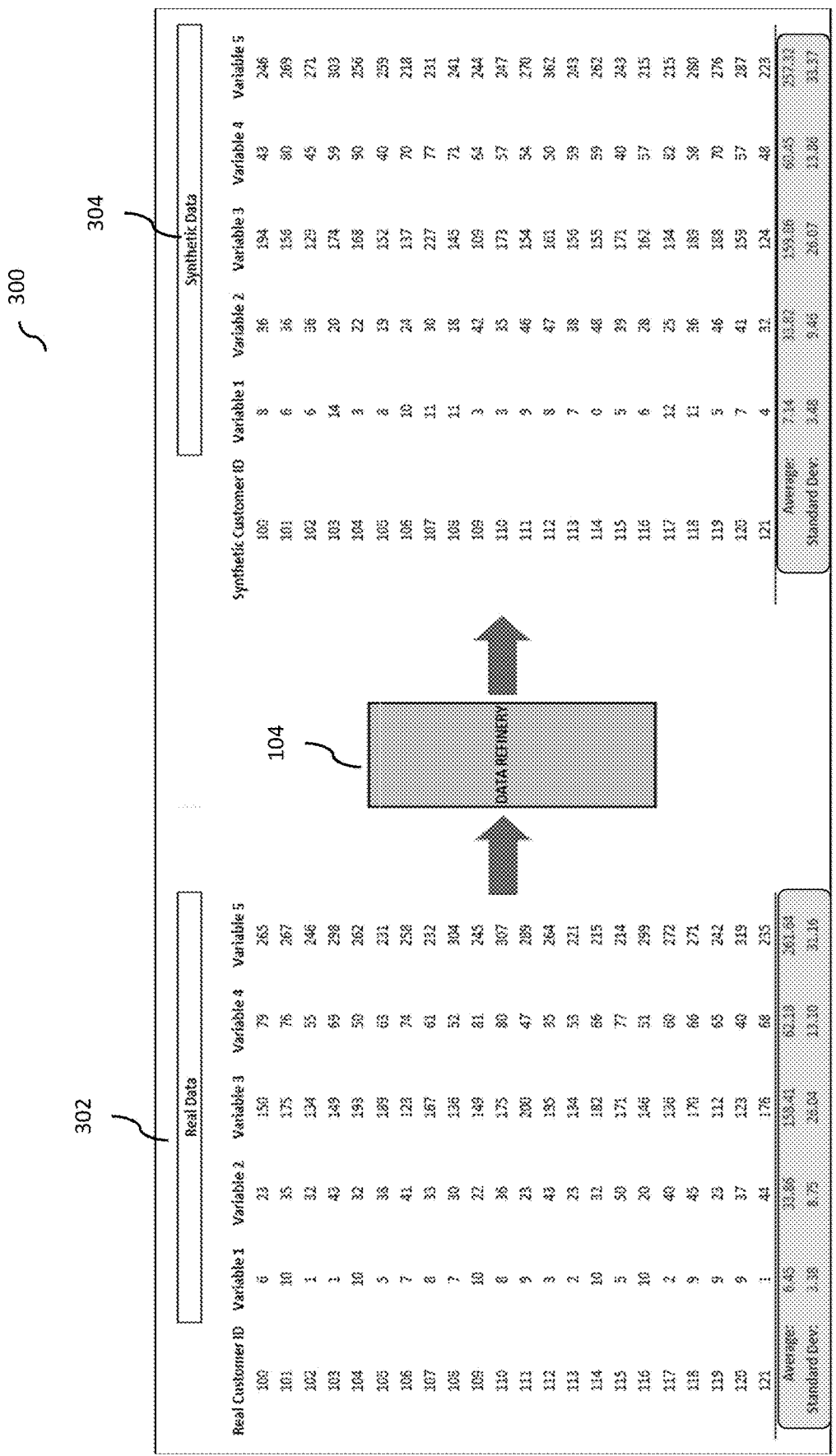
FIG. 3 illustrates an example of a source data being transformed into unidentifiable synthetic data, according to some implementations of the current subject matter.

Then, at 216, the component 111 may be configured to determine an average k-anonymity across all rows to represent the un-identifiability of the synthetic dataset. It should be noted that the higher the average k-anonymity across all rows the better. FIG. 3 illustrates an example 300 of a source data being transformed into unidentifiable synthetic data. As shown in FIG. 3, an original (real data) source data 302 that may have been received from one or more sources 102 (shown in FIG. 1) may be processed using data refinery engine 104 (also shown in FIG. 1) using process 200 (shown in FIG. 2) to generate synthetic data 304.

The synthetic data 304 may be configured to correlate to the source data 302. For example, in the source data 302, an average value of "Variable 1" is 6.45 and its standard deviation value is 3.38. In the synthetic data 304, an average value for "Variable 1" is 7.14 and its standard deviation is 3.48. Values for "Variable 2" are likewise close (values 33.86 and 33.82 and corresponding standard deviations of 8.75 and 9.46 in the source and synthetic data, respectively). An overall average values (261.64 and 257.32) and standard deviations (31.16 and 33.37) are similarly close between source and synthetic data 302, 304.

Figure 4:
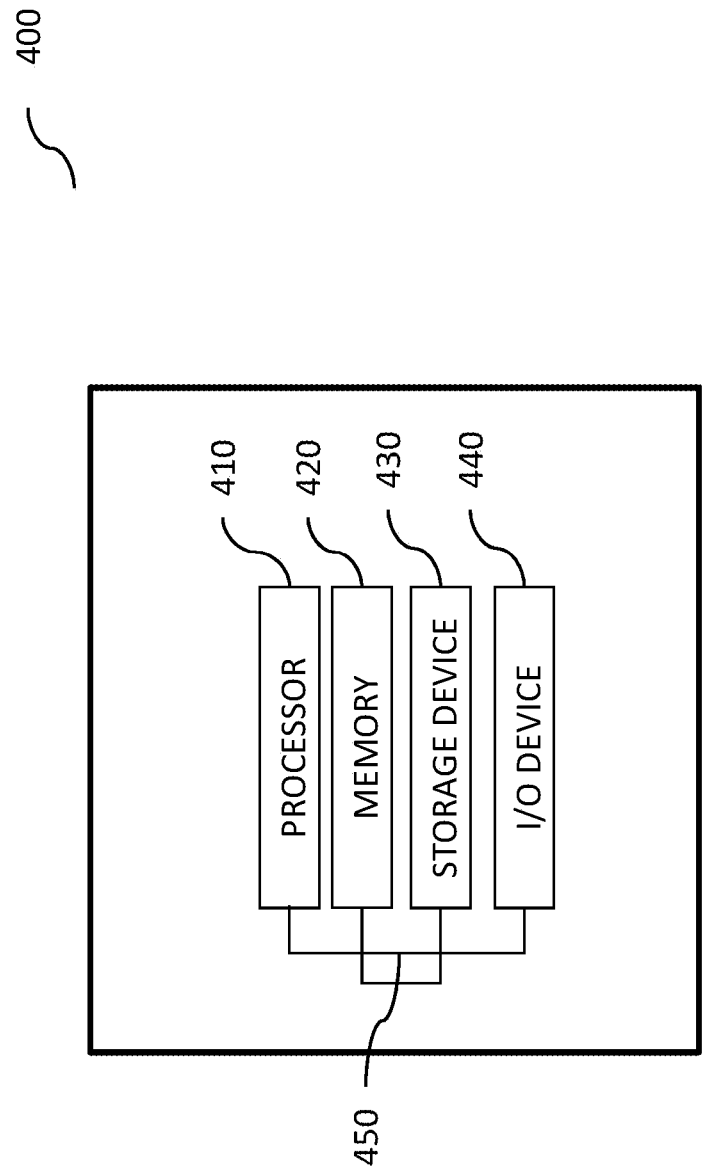
FIG. 4 illustrates an example of a system, according to some implementations of the current subject matter.

In some implementations, the current subject matter may be configured to be implemented in a system 400, as shown in FIG. 4. The system 400 may include a processor 410, a memory 420, a storage device 430, and an input/output device 440. Each of the components 410, 420, 430 and 440 may be interconnected using a system bus 450. The processor 410 may be configured to process instructions for execution within the system 400. In some implementations, the processor 410 may be a single-threaded processor. In alternate implementations, the processor 410 may be a multi-threaded processor. The processor 410 may be further configured to process instructions stored in the memory 420 or on the storage device 430, including receiving or sending information through the input/output device 440. The memory 420 may store information within the system 400. In some implementations, the memory 420 may be a computer-readable medium. In alternate implementations, the memory 420 may be a volatile memory unit. In yet some implementations, the memory 420 may be a non-volatile memory unit. The storage device 430 may be capable of providing mass storage for the system 400. In some implementations, the storage device 430 may be a computer-readable medium. In alternate implementations, the storage device 430 may be a floppy disk device, a hard disk device, an optical disk device, a tape device, non-volatile solid state memory, or any other type of storage device. The input/output device 440 may be configured to provide input/output operations for the system 400. In some implementations, the input/output device 440 may include a keyboard and/or pointing device. In alternate implementations, the input/output device 440 may include a display unit for displaying graphical user interfaces.

Figure 5:
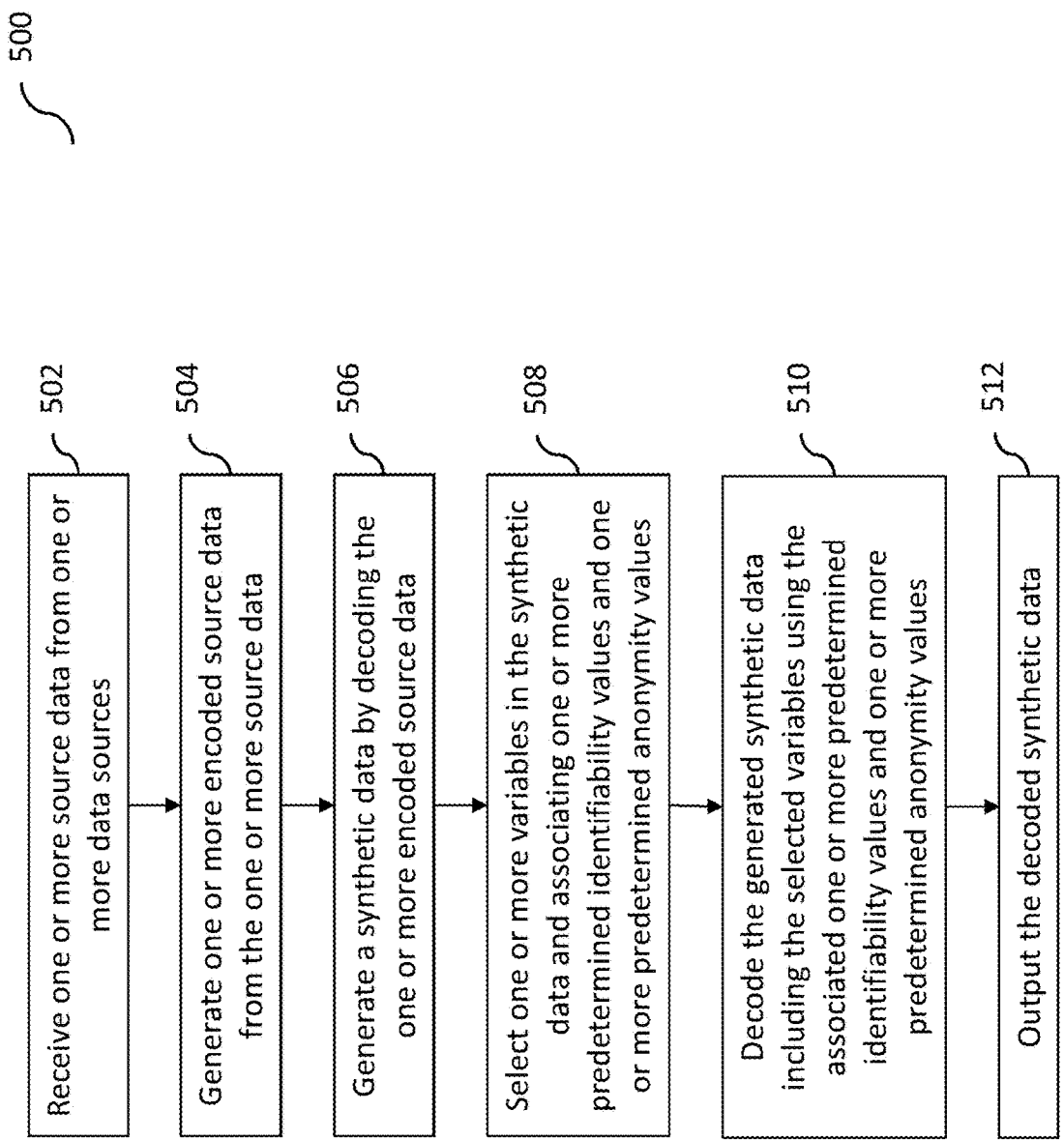
FIG. 5 illustrates an example of a method, according to some implementations of the current subject matter.

FIG. 5 illustrates an example of a method 500 for generating a refined (de-identified and anonymized) synthetic data from one or more sources of data, according to some implementations of the current subject matter. The method 500 may be performed by the system 100. For example, the process 500 may be executed using the engine 104 (shown in FIG. 1), where the engine may be any combination of hardware and/or software.

At 502, the engine 104 may receive one or more source data from one or more data sources (e.g., sources 102 as shown in FIG. 2). The data may be any type of data for which conversion into a synthetic data may be desired.

At 504, the engine 104 may generate one or more encoded source data from one or more source data. This process may be performed by the encoder component 105 of the autoencoder component 103 (as shown in FIG. 1). The encoded data may have a lower dimensionality (e.g., fewer dimensions) than the original source data. The encoded data may be input to the coding component 107 of the autoencoder component 103.

At 506, the engine 104 may generate a synthetic data by decoding one or more encoded source data. This may be accomplished using the decoder component 109 of the autoencoder component 103, i.e., an output of the decoder component 109 may include synthetic data.

At 508, the engine 104 may selecting one or more variables (e.g., rows) in the synthetic data and associate one or more predetermined identifiability values (e.g., identifiability thresholds as discussed in connection with FIG. 2 above) and one or more predetermined anonymity values (e.g., k-anonymity values as discussed above with regard to FIG. 2). This process may be performed using the latent space augmentation component 111 to refine the synthetic data.

At 510, the engine 104 may be configured to run the synthetic data through the decoder component 113 (and/or decoder component 109) by decoding the generated synthetic data including the selected variables using the associated one or more predetermined identifiability values and one or more predetermined anonymity values. At 512, the engine 104 may output the decoded synthetic data that may be guaranteed to meet the requirements of anonymity and identifiability set by the user of the system (e.g., display it on a screen, transmit to another processor, etc.).

In some implementations, the current subject matter can include one or more of the following optional features. The generating of one or more encoded source data and the generating of synthetic data may be performed using a neural network based generative model (e.g., autoencoder).

In some implementations, the predetermined identifiability values may be determined based on one or more augmented vectors (e.g., operations 204-210 in FIG. 2) defined based on one or more variables in the generated synthetic data and a distance between one or more augmented vectors and one or more variables in the one or more source data. The decoded synthetic data may be generated using one or more augmented vectors (e.g., operation 212 in FIG. 2). One or more predetermined anonymity values may be determined based on a comparison of one or more variables in one or more source data and one or more variables in the decoded synthetic data (e.g., operation 214 in FIG. 2).

In some implementations, the method may include determining one or more matches between one or more values associated with one or more variables in one or more source data and one or more variables in the decoded synthetic data (operations 215, 217 in FIG. 2), and generating, based on one or more determined matches, one or more predetermined anonymity values (operation 216 in FIG. 2).

In some implementations, the receiving may include pre-processing received one or more source data to remove one or more errors (e.g., missing values, missing methods, etc.) from one or more source data.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising:
    receiving, using at least one processor, one or more source data from one or more data sources;
    generating, using the at least one processor, one or more encoded source data from the one or more source data;
    generating a synthetic data by decoding the one or more encoded source data;
    selecting one or more variables in the synthetic data;
    associating one or more predetermined identifiability values with the one or more variables in the synthetic data, a predetermined identifiability value determined by a latent space augmentation process as a first threshold that indicates a level of identifiability between the synthetic data and corresponding source data according to on one or more augmented vectors defined based on the one or more variables in the synthetic data and a distance between the one or more augmented vectors and one or more variables in the one or more source data;
    associating one or more predetermined anonymity values with the one or more variables in the synthetic data, a predetermined anonymity value determined by the latent space augmentation process as a second threshold that indicates a level of anonymity between the synthetic data and the corresponding source data;
    decoding the generated synthetic data including the selected variables using the associated one or more predetermined identifiability values and one or more predetermined anonymity values; and
    outputting the decoded synthetic data.

2. The method according to claim 1, wherein the generating the one or more encoded source data and the generating the synthetic data is performed using a neural network based generative model.

3. The method according to claim 1, wherein the decoded synthetic data is generated using the one or more augmented vectors.

4. The method according to claim 3, wherein the one or more predetermined anonymity values are determined based on a comparison of the one or more variables in the one or more source data and one or more variables in the decoded synthetic data.

5. The method according to claim 4, further comprising determining one or more matches between one or more values associated with the one or more variables in the one or more source data and one or more variables in the decoded synthetic data; and generating, based on the one or more determined matches, the one or more predetermined anonymity values.

6. The method according to claim 1, wherein the receiving includes pre-processing the received one or more source data to remove one or more errors from the one or more source data.

7. A system comprising:
   at least one programmable processor; and
   a non-transitory machine-readable medium storing instructions that, when executed by the at least one programmable processor, cause the at least one programmable processor to perform operations comprising:
      receiving one or more source data from one or more data sources;
      generating one or more encoded source data from the one or more source data;
      generating a synthetic data by decoding the one or more encoded source data;
      selecting one or more variables in the synthetic data;
      associating one or more predetermined identifiability values with the one or more variables in the synthetic data, a predetermined identifiability value determined by a latent space augmentation process as a first threshold that indicates a level of identifiability between the synthetic data and corresponding source data according to on one or more augmented vectors defined based on the one or more variables in the synthetic data and a distance between the one or more augmented vectors and one or more variables in the one or more source data;
      associating one or more predetermined anonymity values with the one or more variables in the synthetic data, a predetermined anonymity value determined by the latent space augmentation process as a second threshold that indicates a level of anonymity between the synthetic data and the corresponding source data;
      decoding the generated synthetic data including the selected variables using the associated one or more predetermined identifiability values and one or more predetermined anonymity values; and
      outputting the decoded synthetic data.

8. The system according to claim 7, wherein the generating the one or more encoded source data and the generating the synthetic data is performed using a neural network based generative model.

9. The system according to claim 7, wherein the decoded synthetic data is generated using the one or more augmented vectors.

10. The system according to claim 9, wherein the one or more predetermined anonymity values are determined based on a comparison of the one or more variables in the one or more source data and one or more variables in the decoded synthetic data.

11. The system according to claim 10, wherein the operations further comprise determining one or more matches between one or more values associated with the one or more variables in the one or more source data and one or more variables in the decoded synthetic data; and generating, based on the one or more determined matches, the one or more predetermined anonymity values.

12. The system according to claim 7, wherein the receiving includes pre-processing the received one or more source data to remove one or more errors from the one or more source data.

13. A computer program product comprising a non-transitory machine-readable medium storing instructions that, when executed by at least one programmable processor, cause the at least one programmable processor to perform operations comprising:
   receiving one or more source data from one or more data sources;
   generating one or more encoded source data from the one or more source data;
   generating a synthetic data by decoding the one or more encoded source data;
   selecting one or more variables in the synthetic data;
   associating one or more predetermined identifiability values with the one or more variables in the synthetic data, a predetermined identifiability value determined by a latent space augmentation process as a first threshold that indicates a level of identifiability between the synthetic data and corresponding source data according to on one or more augmented vectors defined based on the one or more variables in the synthetic data and a distance between the one or more augmented vectors and one or more variables in the one or more source data;
   associating one or more predetermined anonymity values with the one or more variables in the synthetic data, a predetermined anonymity value determined by the latent space augmentation process as a second threshold that indicates a level of anonymity between the synthetic data and the corresponding source data;
   decoding the generated synthetic data including the selected variables using the associated one or more predetermined identifiability values and one or more predetermined anonymity values; and
   outputting the decoded synthetic data.

14. The computer program product according to claim 13, wherein the generating the one or more encoded source data and the generating the synthetic data is performed using a neural network based generative model.

15. The computer program product according to claim 13, wherein the decoded synthetic data is generated using the one or more augmented vectors.

16. The computer program product according to claim 15, wherein the one or more predetermined anonymity values are determined based on a comparison of the one or more variables in the one or more source data and one or more variables in the decoded synthetic data.

17. The computer program product according to claim 16, wherein the operations further comprise determining one or more matches between one or more values associated with the one or more variables in the one or more source data and one or more variables in the decoded synthetic data; and generating, based on the one or more determined matches, the one or more predetermined anonymity values.

18. The computer program product according to claim 13, wherein the receiving includes pre-processing the received one or more source data to remove one or more errors from the one or more source data.

* * * * *